United States Patent
Kuenemund

(10) Patent No.: US 8,130,008 B2
(45) Date of Patent: Mar. 6, 2012

(54) INTEGRATED CIRCUIT WITH A RADIATION-SENSITIVE THYRISTOR STRUCTURE

(75) Inventor: Thomas Kuenemund, Munich (DE)

(73) Assignee: Infineon Technologies AG, Neubiberg (DE)

( * ) Notice: Subject to any disclaimer, the term of this patent is extended or adjusted under 35 U.S.C. 154(b) by 110 days.

(21) Appl. No.: 12/714,678

(22) Filed: Mar. 1, 2010

(65) Prior Publication Data
US 2011/0210782 A1 Sep. 1, 2011

(51) Int. Cl.
*G01R 31/02* (2006.01)

(52) U.S. Cl. ................. 324/762.01; 324/762.1

(58) Field of Classification Search ... 324/762.01–762.1
See application file for complete search history.

(56) References Cited

U.S. PATENT DOCUMENTS

| | | | | |
|---|---|---|---|---|
| 3,723,769 A | * | 3/1973 | Collins | 307/117 |
| 5,262,885 A | * | 11/1993 | Steers et al. | 398/135 |
| 5,852,381 A | * | 12/1998 | Wilmot et al. | 327/440 |
| RE36,770 E | * | 7/2000 | Piccone | 257/124 |
| 7,440,310 B2 | * | 10/2008 | Bhattacharyya | 365/149 |
| 7,692,211 B1 | * | 4/2010 | Temple et al. | 257/150 |
| 7,821,016 B2 | * | 10/2010 | Krutsick | 257/80 |

* cited by examiner

Primary Examiner — Huy Q Phan
Assistant Examiner — Joshua Benitez
(74) Attorney, Agent, or Firm — Murphy, Bilak & Homiller, PLLC

(57) ABSTRACT

An integrated circuit comprises a circuit used for storing or processing data and a radiation-sensitive thyristor structure configured to conditionally short two power supply terminals of the integrated circuit. The thyristor structure is configured to turn on in response to a region of the thyristor structure being irradiated with radiation to which the thyristor structure is sensitive, in order to establish an electrically conductive connection between a first power supply terminal of the power supply terminals of the integrated circuit and a second power supply terminal of the power supply terminals of the integrated circuit. The thyristor structure is further configured so that a power density of the radiation needed for turning on the thyristor structure is lower than a power density of the radiation needed for a change of data of the circuit used for storing or processing data.

21 Claims, 9 Drawing Sheets

US 8,130,008 B2

INTEGRATED CIRCUIT WITH A RADIATION-SENSITIVE THYRISTOR STRUCTURE

BACKGROUND

In the art, there is a desire to have a concept for preventing systematic fault attacks by means of radiation, for example, ionizing radiation, on digital circuits, such as may occur in ICs for security applications.

Conventionally, light sensors, which are embodied as analog circuits and designed to protect the entire IC or at least very large portions thereof against global (large-area) attacks, but not individual, smaller circuit blocks against local attacks (on areas of few $\mu m^2$ up to several 100 $\mu m^2$), are integrated on ICs for security applications.

Moreover, the functional principles of such analog circuits are based on different physical effects than those which are utilized in fault attacks on digital circuits, e.g., static CMOS gates, in order to achieve the desired malfunction. Therefrom, it also follows that local fault attacks on individual, small circuit blocks cannot be recognized with sufficient probability by these analog circuits.

It becomes clear from the above that there is a desire for a concept of detection of a local fault attack on an integrated circuit or a chip card.

SUMMARY

Embodiments according to the present invention provide an integrated circuit, comprising a circuit used for storing or processing data, and a radiation-sensitive thyristor structure configured to short two power supply terminals of the integrated circuit, wherein the thyristor structure is configured to turn on responsive to a region of the thyristor structure being irradiated with radiation to which the thyristor structure is sensitive, in order to establish an electrically conductive connection between a first power supply terminal of the power supply terminals of the integrated circuit and a second power supply terminal of the power supply terminals of the integrated circuit, and wherein the thyristor structure is configured so that a power density of the radiation needed for the turning on of the thyristor structure is lower than a power density of the radiation needed for a change of data of the circuit used for storing or processing data of the integrated circuit.

BRIEF DESCRIPTION OF THE DRAWINGS

Embodiments according to the present invention will be explained in greater detail in the following on the basis of the accompanying drawings, in which.

DETAILED DESCRIPTION

Figure 1:
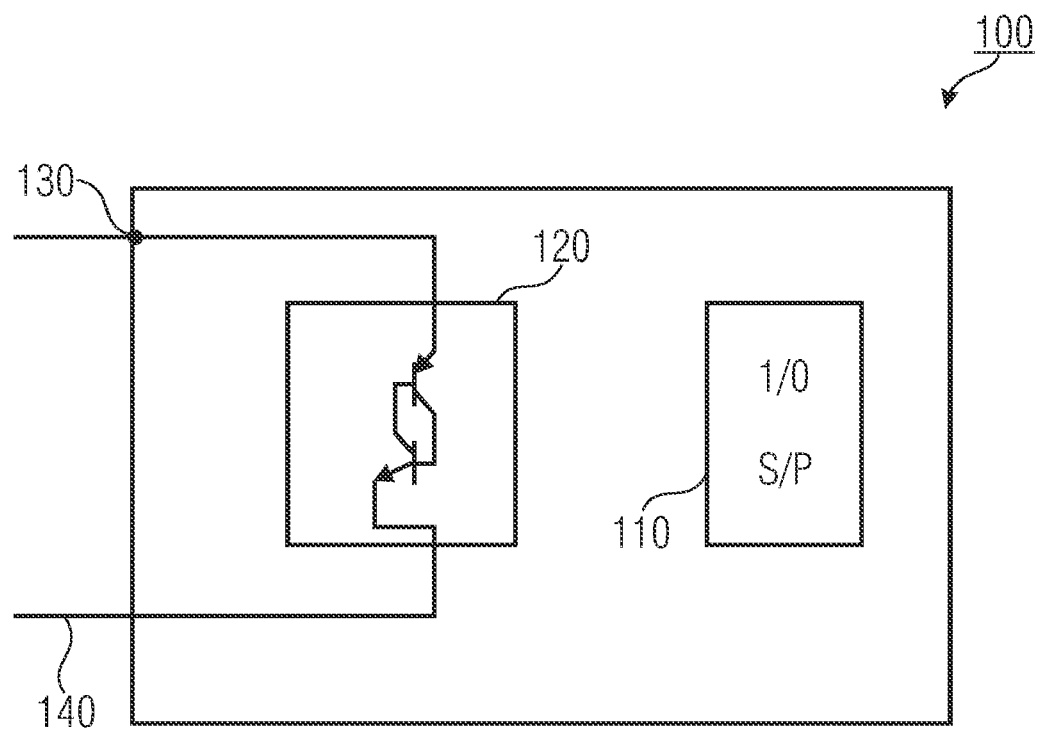
FIG. 1 is a schematic illustration of an integrated circuit according to an embodiment.

Before embodiments of the present invention will be explained in greater detail in the following with reference to the figures, it is to be pointed out that the same or functionally equal or equivalent elements are provided with the same reference numerals in the figures, and that a repeated description of these elements shall be omitted. Hence, the description of the elements provided with the same reference numerals is mutually interchangeable and/or applicable in the various embodiments.

FIG. 1 shows a schematic illustration of an integrated circuit 100 according to an embodiment. The integrated circuit 100 comprises a circuit 110 for storing or processing data, wherein the circuit 110 may be configured to perform one or both of the functions of storing data or processing data. The circuit 110 may, for example, be a processing circuit 110, which processes (e.g., performs a calculation with) data received at an input and provides processed data at an output, or a memory unit 110 for storing a logic state, for example, a Flip Flop, a Latch or an SRAM-cell (Static Random Access Memory) or any other memory element. Furthermore, the integrated circuit 100 comprises a thyristor structure 120, a first power supply terminal 130 and a second power supply terminal 140. The first power supply terminal 130 may, for example, be an internal or external supply voltage terminal 130 of the integrated circuit 100. The second power supply terminal 140 may, for example, be an internal or external ground terminal 140 of the integrated circuit 100. The first power supply terminal 130 and the second power supply terminal 140 may, for example, be internal or external to the integrated circuit 100. The thyristor structure 120 can be configured to short the two power supply terminals 130, 140 in response to irradiation of the thyristor structure 120. In other words, the thyristor structure 120 can be configured to provide an electrically conducting connection between the two power supply terminals 130, 140 if a region of the thyristor structure 120 is irradiated with radiation to which the thyristor structure 120 is sensitive, for example, ionizing radiation. The circuit 110, just like the thyristor structure 120, can be sensitive to radiation (for example, as a parasitic effect). Irradiation of the circuit 110 may lead to flipping of a bit stored in the circuit 110 (e.g., if the circuit 110 comprises a memory unit) or to a malfunction of the circuit 110 (e.g., if the circuit 110 comprises a processing circuit, like a cryptographic processor). In both cases (that is, in the thyristor structure 120 as well as the circuit 110), photo-current impulses, which develop through photo-ionization (electron-hole pair generation) within reverse-biased pn junctions, are the cause. In embodiments, a power density of the radiation needed to turn on the thyristor structure 120 is lower than a power density of the radiation needed to change the data of the circuit 110 (e.g., to induce a malfunction or to flip a bit stored in the circuit 110). In other words, the thyristor structure 120 is optimized so as to turn on upon irradiation, e.g., before a malfunction of the circuit 110 occurs or before a bit of the circuit 110 flips, i.e., before a logic state of the circuit 110 changes.

Thus, embodiments allow for protection of integrated circuits from fault attacks by means of ionizing radiations. An attacker trying to flip a bit stored in the circuit 110 or trying to induce a malfunction of the circuit 110 of the integrated circuit 100 will unintentionally trigger a turning on of the thyristor structure 120 before the bit flips in the circuit 110 or the malfunction of the circuit 110 is induced. The turning on (the firing) of the thyristor structure 120 leads to a short between the two power supply terminals 130, 140, i.e., the supply voltage terminal and the ground terminal of the integrated circuit 100, for example, which may lead to deactivation of the integrated circuit 100 or even to destruction of the integrated circuit 100.

According to some embodiments, an integrated circuit may comprise a plurality of thyristor structures and circuits used for storing and/or processing data, wherein a power density of the ionizing radiation needed for the turning on of the thyristor structures is lower than needed for a change of data of the circuits used for storing and/or processing data, e.g., a change of state of data stored in the circuits, or a malfunction of a processing function of the circuits.

The circuit 110 may, for example, be the most radiation sensitive circuit of the integrated circuit 110 besides the thyristor structure 120, which of course is more radiation sensitive than the circuit 110.

Figure 2:
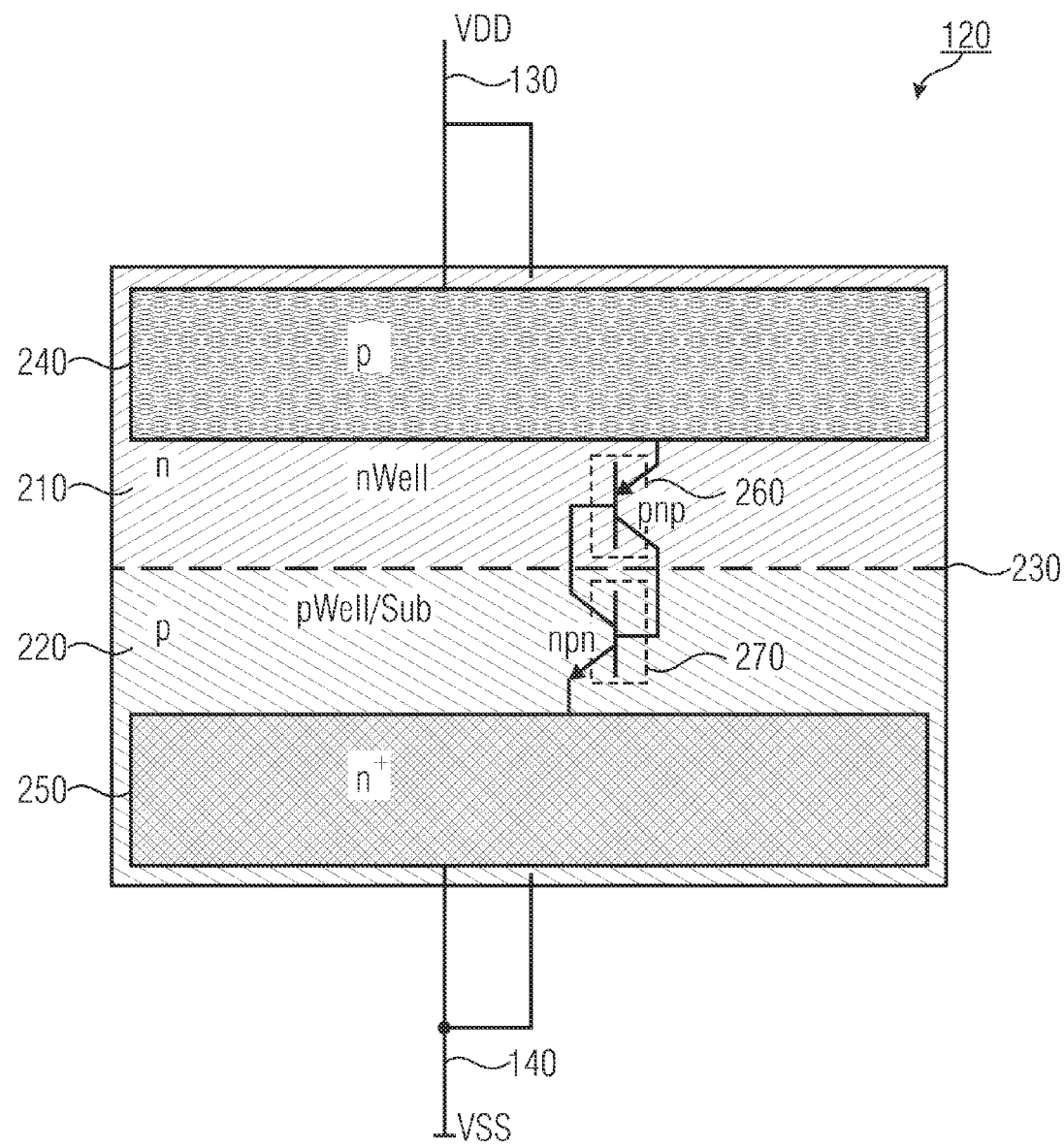
FIG. 2 is a schematic illustration of a thyristor structure for use in an integrated circuit according to an embodiment.

FIG. 2 shows a schematic illustration of a thyristor structure 120, as it may find use in an integrated circuit (the integrated circuit 100 according to FIG. 1, for example) according to an embodiment. The thyristor structure 120 shown in FIG. 2 comprises a first semiconductor structure 210 of a first doping type. The first semiconductor structure may, for example, be a lightly n-doped n well. Furthermore, the thyristor structure 120 comprises a second semiconductor structure 220 of a second doping type. The second semiconductor structure 220 may, for example, be a lightly p-doped p well or alternatively part of a lightly p-doped p substrate. The first semiconductor structure 210 is adjacent to the second semiconductor structure 220, so that an interface (a junction) 230 is formed between the first semiconductor structure 210 and the second semiconductor structure 220, i.e., between regions comprising the first doping type and the second doping type. As already mentioned previously, the first doping type may be an n-doping type, and the second doping type may be a p-doping type, for example, or vice versa. Hence, the interface 230 may be formed as a first pn-junction of the thyristor structure 120. The thyristor structure 120 further comprises a first semiconductor region 240 of the second doping type and a second semiconductor region 250 of the first doping type.

According to embodiments, the first semiconductor region 240 may be doped more heavily than the second semiconductor structure 220, and the second semiconductor region 250 may be doped more heavily than the first semiconductor structure 210.

The first semiconductor region 240 is arranged in the first semiconductor structure 210, so that a second pn junction is formed between the first semiconductor region 240 and the first semiconductor structure 210. The second semiconductor region 250 is arranged in the second semiconductor structure 220, so that a third pn junction is formed between the first semiconductor region 250 and the first semiconductor structure 220.

According to some embodiments, the second semiconductor structure 220 may be a part of a semiconductor substrate, for example, a lightly p-doped substrate, and the first semiconductor structure 210 may be arranged in the p-doped semiconductor substrate as an n-doped well, for example.

According to some embodiments, the first semiconductor structure 210 may be connected to a first power supply terminal 130, for example, a supply voltage terminal. Furthermore, the second semiconductor structure 220 may be connected to a second power supply terminal 140, for example, a ground terminal. The arrangement of the semiconductor regions 240, 250 and the semiconductor structures 210, 220 yields two (parasitic) transistors 260, 270 connected to each other. A pn junction of the first pnp transistor 260 is formed by the second junction between the first semiconductor region 240 and the first semiconductor structure 210. An np junction of the transistor 260 is formed by the interface 230, that is, the first junction between the first semiconductor structure 210 and the second semiconductor structure 220. An np junction of the second transistor 270 is formed, corresponding to the np junction of the transistor 260, by the interface 230, that is, the first junction between the first semiconductor structure 210 and the second semiconductor structure 220. A pn junction of the transistor 270 is formed by the third junction between the second semiconductor structure 220 and the second semiconductor region 250. If the same potential which is applied to the first semiconductor structure 210 is also applied to the first semiconductor region 240 (e.g., a supply voltage potential), and if the same potential which is applied to the second semiconductor structure 220 is also applied to the second semiconductor region 250 (e.g., a ground potential), the thyristor structure 120 may turn on in the case of incident radiation with sufficient power density. In the concrete embodiment shown in FIG. 2, the first semiconductor region 240 may be heavily p$^+$-doped, the first semiconductor structure 210 may be lightly n-doped, the second semiconductor structure 220 may be lightly p-doped, and the second semiconductor region 250 may be heavily n$^+$-doped.

For ensuring the turning on (i.e., the action or the firing) of the thyristor structure 120, a supply voltage (e.g., a positive supply voltage, which is positive when compared to the ground potential) may be applied to the n-doped first semiconductor structure 210 and the p$^+$-doped first semiconductor region 240, and a ground potential may be applied to the p-doped second semiconductor structure 220 and to the n$^+$-doped second semiconductor region 250. If the potential of the n-doped first semiconductor structure 210 drops by at least a barrier voltage of the p$^+$n junction between the p$^+$-doped first semiconductor region 240 and the n-doped first semiconductor structure 210 with respect to the potential of the p$^+$-doped first semiconductor region 240, or if the potential of the p-doped second semiconductor structure 220 increases by at least a barrier voltage of the pn$^+$ junction between the n$^+$-doped second semiconductor region 250 and the p-doped second semiconductor structure 220 with respect to the potential of the n$^+$-doped second semiconductor region 250, the parasitic thyristor, i.e., the thyristor structure 120 turns on.

A barrier voltage of the above mentioned junctions may, for example, be a diode reverse voltage, and may in general be a "built-in" potential of the junctions.

In other words, if the potential of the n-doped first semiconductor structure 210 decreases sufficiently, the p$^+$n junction of the first transistor 260 becomes forward biased, and the thyristor structure 120 may turn on. Conversely, if the potential of the p-doped second semiconductor structure 220 increases, the pn$^+$ junction of the second transistor 270 becomes forward biased and the thyristor structure 120 may turn on. The thyristor structure 120 thus forms a low-ohmic connection between operating voltage (e.g., the positive supply voltage) and ground (e.g., the ground potential), i.e., between the (internal or external) supply voltage terminal and the (internal or external) ground terminal of an integrated circuit in which the thyristor structure 120 is used. This may have grave consequences for the function of the integrated circuit and even lead to the destruction of the integrated circuit.

The decrease of the potential of the n-doped first semiconductor structure 210 and/or the increase of the potential of the p-doped second semiconductor structure 220 can be generated by charge separation in the space charge zone of the first junction between the n-doped first semiconductor structure 210 and the p-doped second semiconductor structure 220, i.e., at the interface 230. The charge separation here takes place by way of ionizing radiation, for example.

In other words, FIG. 2 schematically shows the "parasitic" $p^+$-n-p-$n^+$ thyristor 120 of an nWell-pWell/pSub CMOS structure. Here, the n-doped well nWell 210 is connected to the high operating potential VDD via well contacts (via a first power supply terminal 130), and the p-doped well and/or the p-doped substrate pWell/Sub 220 is connected to the low operating potential VSS (via a second power supply terminal 140). The $p^+$ region 240 and the $n^+$ region 250, which serve as source/drain regions for the $p^+$np transistor 260 and the $npn^+$ transistor 270, respectively, may each be connected to VDD or VSS.

If the $p^+$ region 240 is connected to VDD and the $n^+$ region 250 to VSS, the parasitic thyristor 120 may "turn on" (and thus establish a low-ohmic connection between VDD and VSS), if the local potential of the nWell 210 decreases sufficiently (by at least about a $p^+$-nWell barrier voltage) and/or the local potential of the pWell/Sub 220 increases sufficiently (by at least about an $n^+$-pWell/Sub barrier voltage) due to a "suitable" disturbance (such as charge separation in the space charge zone of the nWell-pWell/Sub junction 230), which is by about 600-700 mV each (for details, i.e., the exact conditions of the development and the various further potential processes of this phenomenon, also called latch-up or SCR (Silicon Controlled Rectifying), reference is made to the specialist literature on the topic).

What is important is that a low-ohmic connection between VDD and VSS established by the parasitic thyristor 120 may have grave consequences for the correct functioning of the circuit concerned (even up to its destruction in the extreme case).

Figure 3:
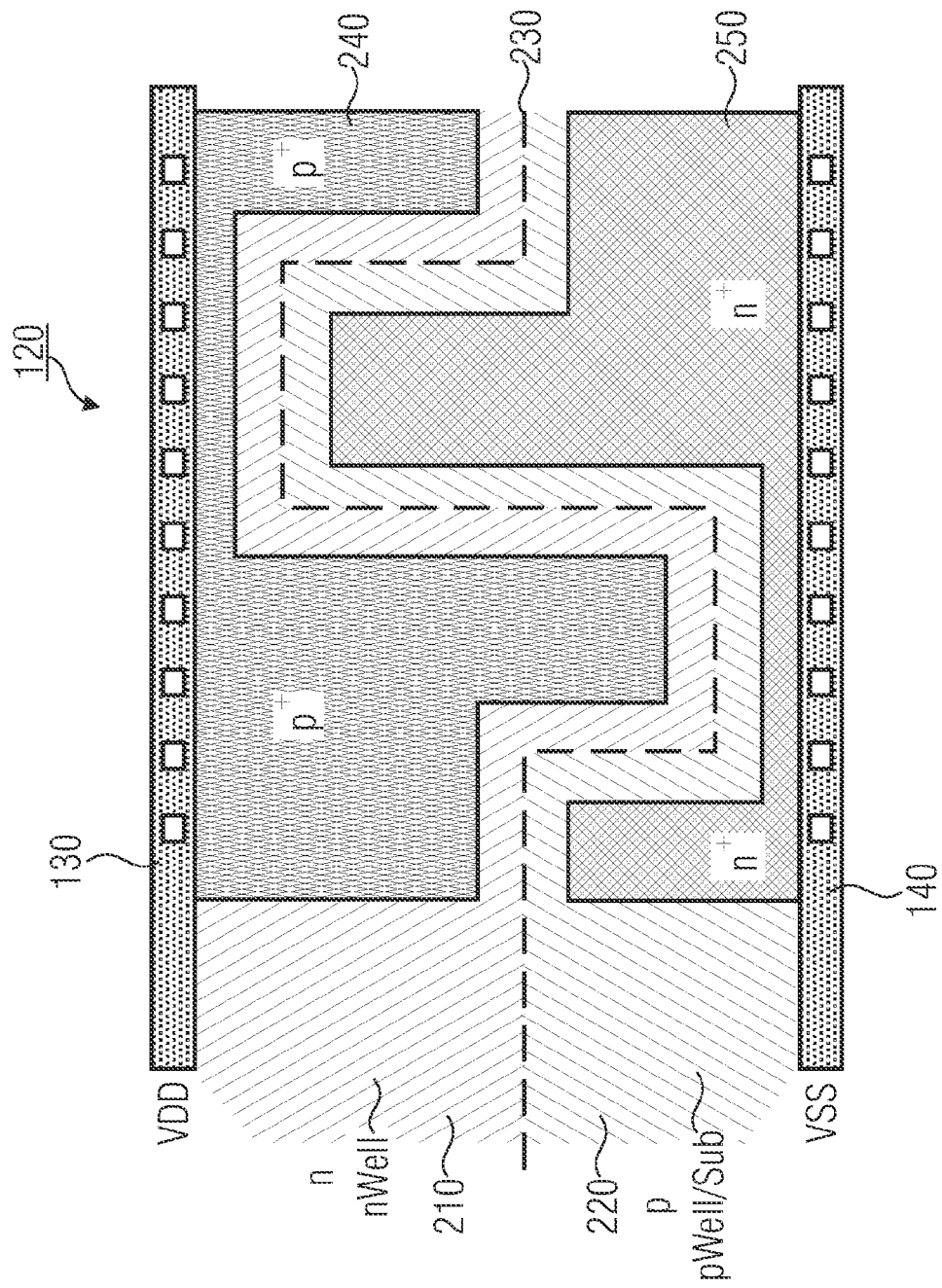
FIG. 3 is a top view onto a thyristor structure for use in an integrated circuit according to an embodiment.

FIG. 3 shows a top view onto a thyristor structure 120 for use in an integrated circuit according to an embodiment. The thyristor structure 120 shown in FIG. 3 may, for example, be similar to the thyristor structure 120 schematically shown in FIG. 2 and may be used in the integrated circuit 100 according to FIG. 1, for example. The thyristor structure 120 shown in FIG. 3 comprises a lightly n-doped first semiconductor structure 210 and a lightly p-doped second semiconductor structure 220. The lightly n-doped first semiconductor structure 210 and the lightly p-doped second semiconductor structure 220 are adjacent, so that an interface (first junction) 230 is formed between lightly n-doped material and lightly p-doped material.

The thyristor structure 120 further comprises a heavily $p^+$-doped first semiconductor region 240 arranged in the lightly n-doped first semiconductor structure 210, so that a $p^+$n junction is formed between the $p^+$-doped first semiconductor region 240 and the lightly n-doped first semiconductor structure 210.

The thyristor structure 120 further comprises a heavily $n^+$-doped first semiconductor region 250 arranged in the lightly p-doped second semiconductor structure 220, so that a $pn^+$ junction is formed between the $n^+$-doped second semiconductor region 250 and the lightly p-doped second semiconductor structure 220.

In other words, the thyristor structure 120 is formed by a $p^+npn^+$ junction sequence. According to some embodiments, as this is shown in FIG. 3, the n-doped first semiconductor structure 210 as well as the $p^+$-doped first semiconductor region 240 may be hard-wired, i.e., connected in an electrically conductive manner, to a supply voltage terminal 130, and the p-doped second semiconductor structure 220 and the $n^+$-doped second semiconductor region 250 may be hard-wired to a ground terminal 140.

According to some embodiments, the thyristor structure 120 shown in FIG. 3 may be optimized (or at least adapted) in its layout so that it is particularly sensitive to radiation-induced SCR (Silicon Controlled Rectifying), which is also called latch-up. In particular, the thyristor structure 120 is optimized (or at least adapted) so that a power density of ionizing radiation needed for turning on the thyristor structure 120 is lower than a power density of radiation needed for a change of data of a circuit 110 of an integrated circuit, comprising the thyristor structure 120 and the circuit 110.

Optimization (or design adaptation) for increasing the sensitivity to ionizing radiation may be done, as shown in FIG. 3, by way of $p^+$-doped first semiconductor regions 240 that are as large as possible and connected to a supply voltage terminal 130, and by way of directly opposite $n^+$-doped second semiconductor regions 250 that are as large as possible and connected to a ground terminal 140. Further optimization (or design adaptation) may be done by choosing the distances of the $p^+$-doped first semiconductor region 240 and the $n^+$-doped second semiconductor region 250 to the interface 230, i.e., to the pn junction 230 of the n-doped first semiconductor structure 210 and the p-doped second semiconductor structure 220, to be as small as possible. Here, the distances may be chosen so that they correspond to the minimum distances of the CMOS layout rules. Further optimization may de done by way of a meander-shaped boundary between the n-doped first semiconductor structure 210 and the p-doped semiconductor structure 220. In other words, according to some embodiments, the interface 230 may be meander-shaped in a lateral direction of expansion, at least in the area of the thyristor structure 120. This increases the well resistances, which also lowers the SCR threshold (energy needed for the thyristor structure 120 to turn on).

In other words, the idea underlying embodiments consists in implementing, at various locations within the circuit to be protected—in accordance with all design rules—certain "SCR structures" (thyristor structures 120). The layout of these "SCR structures" is optimized (or at least adapted) in a way so that these "SCR structures" are particularly sensitive (more sensitive than normal CMOS gates) to radiation-induced SCR (but do not represent any increased risk, or only insignificantly increased risk in normal operation, of course). This "optimization" (or design adaptation) consists in (or comprises) making the current gains of the pnp and npn bipolar transistors (pnp transistor 260 and npn transistor 270 according to FIG. 2) forming the parasitic thyristor 120, to take on as great values as possible by way of suitable layout measures. Among these suitable layout measures are directly opposite VDD-connected $p^+$ regions 240 and/or VSS-connected $n^+$ regions 250 that are as large as possible, each having minimum allowed distances of the $p^+$ regions 240 and/or $n^+$ regions 250 from the nWell-pWell/Sub boundary 230 and a meander-shaped nWell-pWell/Sub boundary 230, also resulting in higher well resistances, which also lowers the SCR threshold.

In contrast to these measures, conventional CMOS gates, which are, of course not optimized for radiation-induced SCR, include p+ and n+ regions with dimensions that are as small as possible. Meander-shaped nWell-pWell/Sub boundaries are also typically avoided easily in conventional designs, e.g., by way of the corresponding layout guideline. Moreover, (approximately) half of all drain regions of these conventional CMOS gates have the corresponding p+ regions connected to VSS and/or the n+ regions to VDD. A parasitic thyristor of these conventional CMOS gates is therefore disabled. The p+/nWell and/or n+/pWell junctions of these conventional CMOS gates are in reverse direction, i.e., they act as "sinks" for the minority charge carriers in the respective wells: p+ at VSS drains off holes within the nWell, and n+ at VDD electrons from the pWell. Thus, the current gain of the parasitic bipolar transistors (of which the p-n-p-n thyristor consists) is reduced. Holes injected from a forward-biased p+/nWell junction from p+ into the nWell (the emitter current of the parasitic pnp transistors) are drained off to some extent by nearby reverse-biased p+/nWell junctions, and can then no longer reach the nWell/pWell junction (i.e., not contribute to the collector current). Electrons injected from a forward-biased n+/pWell junction from n+ into the pWell (the emitter current of the parasitic npn transistor) are drained off to some extent by nearby reverse-biased n+/pWell junctions, and can then no longer reach the pWell/nWell junction (i.e., not contribute to the collector current).

Figure 4:
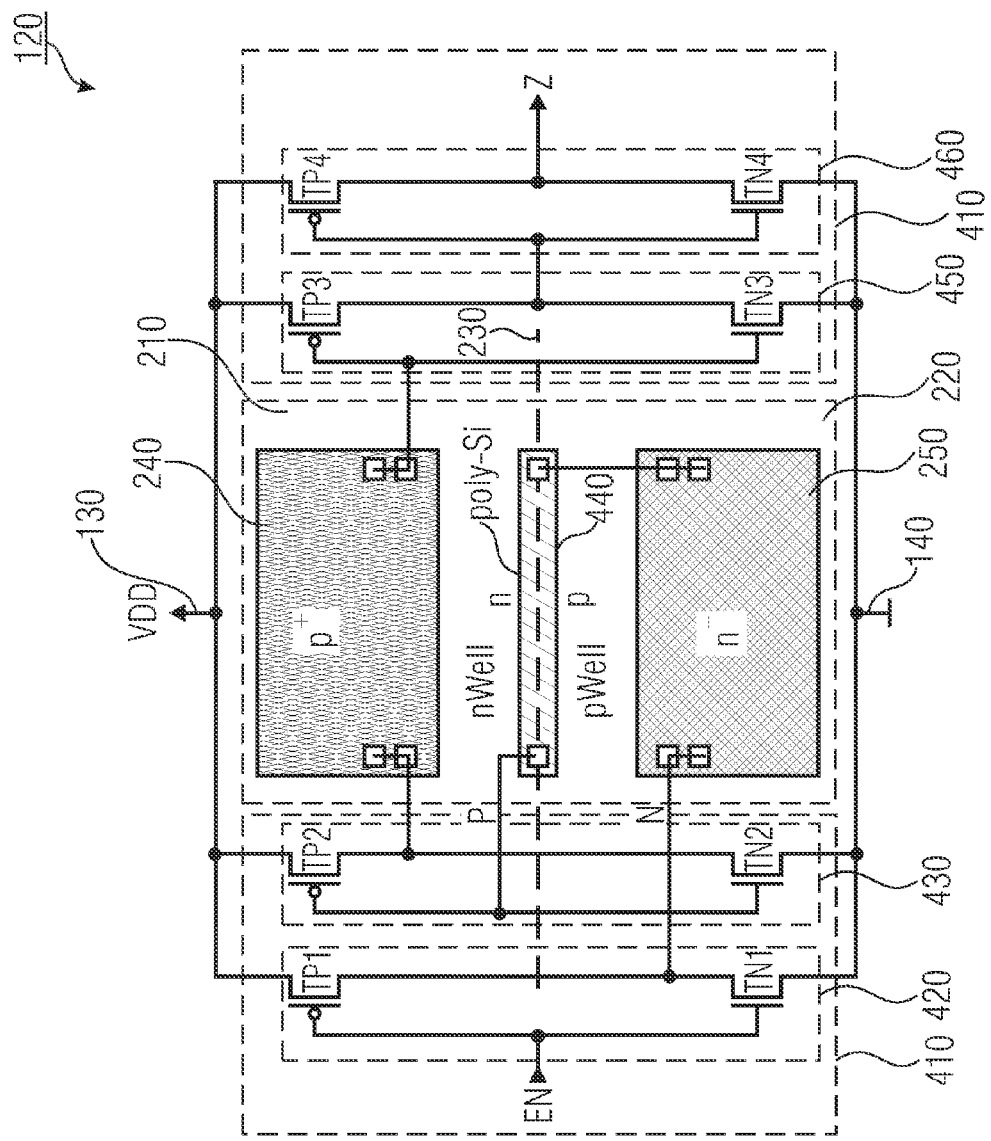
FIG. 4 is a schematic illustration of a thyristor structure and a control circuit for use in an integrated circuit according to an embodiment.

FIG. 4 shows a schematic illustration of a thyristor structure 120 and a control circuit 410, as may be used in an integrated circuit according to an embodiment. The thyristor structure 120 shown in FIG. 4 comprises, as already shown in FIGS. 2 and 3, a first semiconductor structure 210 of a first doping type, for example, an n-doping type, a second semiconductor structure 220 of a second doping type, for example, a p-doping type, a first semiconductor region 240 of the second doping type arranged in the first semiconductor structure 210, and a second semiconductor region 250 of the first doping type arranged in the second semiconductor structure 220.

In the following, it will be assumed that the first doping type is an n-doping type and the second doping type is a p-doping type. However, other doping variants are possible. In contrast to the thyristor structure 120 shown in FIG. 3, the p+-doped first semiconductor region 240 is not hard wired to a supply voltage terminal 130, and the n+-doped second semiconductor region 250 is not hard wired to a ground terminal 140.

According to some embodiments, the control circuit 410 may be configured to switchably connect (e.g., as a switch performing a switch function) the p+-doped first semiconductor region 240 to the supply voltage terminal 130 and the n+-doped second semiconductor region 250 to the ground terminal 140 in a first state, and to switchably conductively connect the p+-doped first semiconductor region 240 to the ground terminal 140 and the n+-doped second semiconductor region 250 to the supply voltage terminal 130, in a second state, on the basis of an input signal (EN in FIG. 4). In other words, the control circuit 410 is configured to enable or disable an action of the thyristor structure 120.

For example, if the p+-doped first semiconductor region 240 is connected to the ground terminal 140, and the n+-doped second semiconductor region 250 is connected to the supply voltage terminal 130, on the basis of the input signal EN (e.g., EN="0") of the control circuit 410, the p+n junction between the p+-doped first semiconductor region 240 and the n-doped first semiconductor structure 210 and also the pn+ junction between the n+-doped second semiconductor region 250 and the p-doped semiconductor structure 220 are reverse-biased, thus not allowing for radiation-induced turning on of the thyristor structure 120, i.e., disabling a thyristor action.

But, if the p+-doped first semiconductor region 240 is connected to the supply voltage terminal 130, and the n+-doped second semiconductor region 250 is connected to the ground terminal 140 on the basis of the input signal EN (e.g., EN="1") of the control circuit 410, the p+n junction between the p+-doped first semiconductor region 240 and the n-doped first semiconductor structure 210 and also the pn+ junction between the n+-doped second semiconductor region 250 and the p-doped semiconductor structure 220 are not reverse-biased, thus allowing for radiation-induced turning on of the thyristor structure 120, i.e., enabling a thyristor action.

According to some embodiments, the control circuit 410 may comprise a first inverter 420 and a second inverter 430. An input of the first inverter 420 may be configured to receive the input signal EN, for example. An output of the first inverter 420 may be connected to the second semiconductor region 250 in an electrically conductive manner at a first side of the second semiconductor region 250. The first side of the second semiconductor region 250 is at a near end of the second semiconductor region 250 with respect to a lateral direction of expansion of the second semiconductor region 250. An input of the second inverter 430 may, for example, be connected to the second semiconductor region 250 via an electrically conductive structure 440, for example, a feedback strip 440 of polysilicon material, at a second side of the second semiconductor region 250. The second side of the second semiconductor region 250 is at a far end of the second semiconductor region 250 with respect to the lateral direction of expansion of the second semiconductor region 250. An output of the second inverter 430 may be connected to the first semiconductor region 240 at a first side, which is at a near end of the first semiconductor region 240 with respect to a lateral direction of expansion of the first semiconductor region 240. According to some embodiments, the control circuit 410 may be configured to form an output signal Z on the basis of the potential of the first semiconductor region 240 and the potential of the second semiconductor region 250. In other words, the control circuit 410 may be configured to check a correct function of the thyristor structure 120. For example, if a 0 is present as an input signal (i.e., EN="0") at the control circuit 410 shown in FIG. 4, the output signal is formed as a 0 (i.e., Z="0"). If a 1 (i.e., EN="1") is present as an input signal, the output signal is formed as a 1 (i.e., Z="1").

In other words, the first semiconductor region 240 and the second semiconductor region 250 are coupled (with the polysilicon feedback strip 440 and the second inverter 430). The control circuit 410 is configured to provide a potential to the second semiconductor region 250, in dependence on the input signal ("EN") of the control circuit 410. The control circuit 410 is configured to provide the output signal ("Z") of the control circuit 410 in dependence on a potential of the first semiconductor region 240.

Hence, the control circuit 410 allows for checking as to whether the thyristor structure 120 has been manipulated, for example, by separating the polysilicon feedback strip 440 or by hard-wiring one of the semiconductor regions 240, 250 to one of the power supply terminals 130, 140. The above-mentioned checking can be performed by an attached processor, for example, a cryptoprocessor.

According to some embodiments, the control circuit 410 may comprise a third inverter 450 and a fourth inverter 460, wherein an input of the third inverter 450 is connected to the first semiconductor region 240 at a second side which is at a far end of the first semiconductor region 240 with respect to the lateral direction of expansion of the first semiconductor region 240, and an output of the third inverter 450 is connected to an input of the fourth inverter 460 in an electrically conductive manner. An output signal (shown as Z in FIG. 4) of the control circuit 410 may then be based on an output of the fourth inverter 460, for example.

According to some embodiments, the control circuit 410 may allow for a test of the relative radiation sensitivities of the integrated circuit 100, in connection with the thyristor structure 120 and a circuit 110 used for storing and/or processing data in an integrated circuit (in the integrated circuit 100 according to FIG. 1, for example). For example, a function of the thyristor structure 120 may be disabled (setting EN to "0") in one step, in order to measure a radiation sensitivity, i.e., a power density needed for a change of data of the circuit 110, and the function of the thyristor structure 120 may be enabled (setting EN to "1") in a second step, in order to determine a relative sensitivity or a power density of the radiation needed for turning on the thyristor structure 120.

In other words, FIG. 4 shows the schematic illustration of an "SCR structure", as may be used in an integrated circuit according to an embodiment, with the input signal EN and the output signal Z, as well as a $p^+$ region 240 and an $n^+$ region 250. The $p^+$ region 240 and an $n^+$ region 250 can be connected to VSS and VDD or alternatively to VDD and VSS by the inverters 420, 430, 450, 460 formed by the transistor pairs (TPx, TNx), wherein x=1, 2, 3, 4. At EN=0, the $p^+$ region 240 is connected to VSS, and the $n^+$ region 250 to VDD, i.e., the p+/nWell and n+/pWell junctions both are reversed-biased, and thus no thyristor action is possible. At EN=1, the $p^+$ region 240 is connected to VDD, and the $n^+$ region 250 to VSS, so that the p+/nWell and n+/pWell junctions both allow for a radiation-induced thyristor action.

In contrast to static variants, wherein the $p^+$ region 240 and $n^+$ region 250 are hard wired to VDD and VSS, respectively (as shown in FIG. 3), a possible thyristor action can be enabled and disabled with the structure of FIG. 4, which has the advantage of being able to control the relative radiation sensitivities of the SCR structures and/or the conventional gates (gates not optimized for radiation induced SCR) in a special test mode. Furthermore, it can be checked as to whether the SCR structures are still implemented as intended, or whether manipulations with the aim of blocking the thyristor function (e.g., by electrically isolating the $p^+$ region 240 and/or $n^+$ region 250 or rewiring them so that they are reversed-biased after the manipulation) have taken place. Such manipulations are made significantly more difficult and/or their effort is increased drastically by simple layout measures, such as the illustrated arrangement of the contacts with the nodes N and P connected to the $n^+$ region 250 and $p^+$ region 240, respectively, as well as by the poly-Si feedback strip 440 from the right end of the $n^+$ region 250 to the input of the inverter 430 formed by the transistors TP2, TN2.

Figure 5:
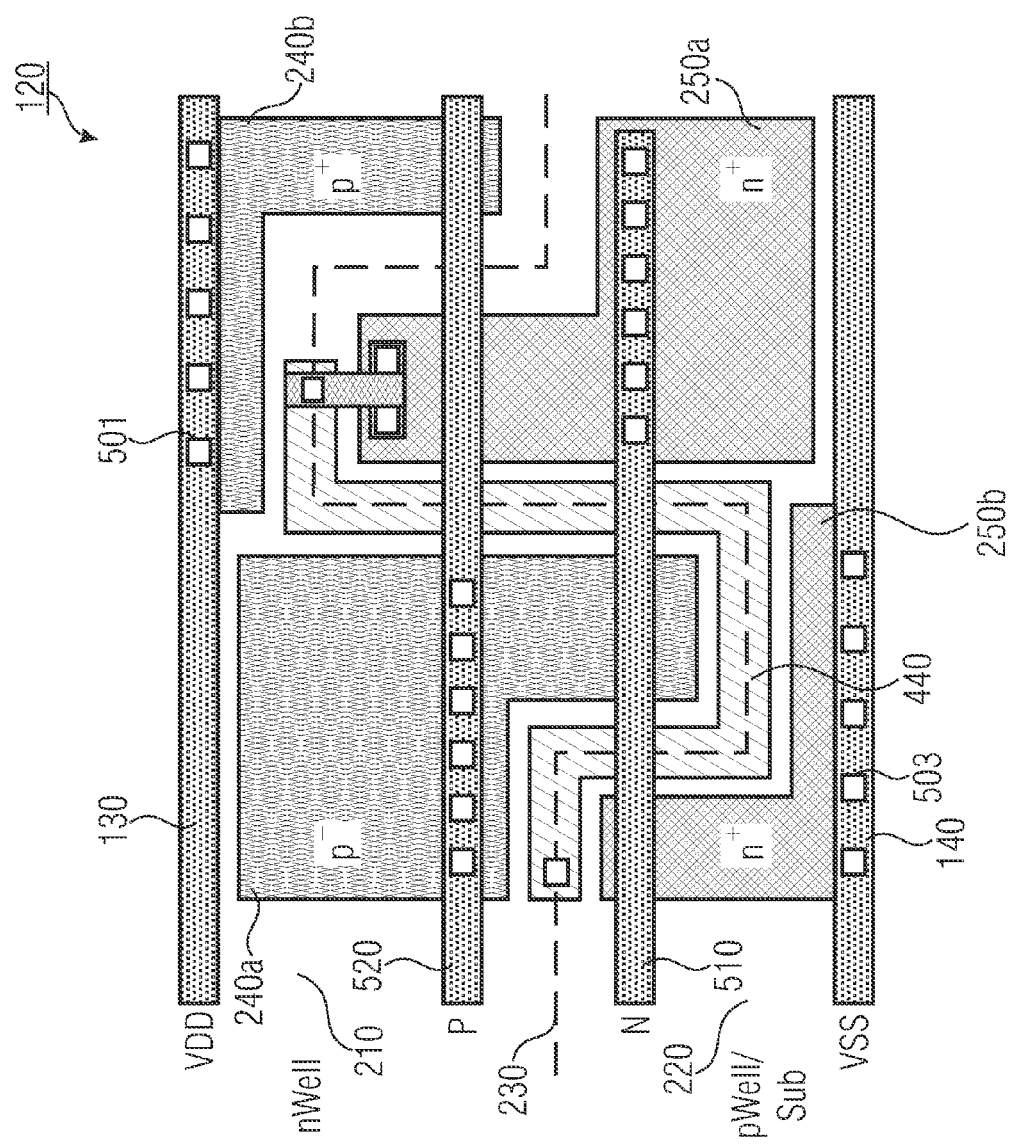
FIG. 5 is a schematic illustration of a top view onto a thyristor structure for use in an integrated circuit according to an embodiment.

FIG. 5 shows a schematic illustration of a top view onto a thyristor structure 120, for use in an integrated circuit according to an embodiment. The thyristor structure 120 shown in FIG. 5, like the thyristor structure 120 shown in FIG. 4, comprises a first semiconductor region 240a and a second semiconductor region 250a, which may selectively be connected to a supply voltage terminal 130 or a ground terminal 140 of the integrated circuit comprising the thyristor structure 120. Furthermore, the thyristor structure 120 shown in FIG. 5 comprises a third semiconductor region 240b hard wired to the supply voltage terminal 130 and of the same doping type as the first semiconductor region 240a, and a fourth semiconductor region 250b hard wired to the ground terminal 140 and of the same doping type as the second semiconductor region 250a. Corresponding to the thyristor structure 120 shown in FIGS. 2-4, the thyristor structure 120 shown in FIG. 5 comprises a first semiconductor structure 210 of a first doping type and second semiconductor structure 220 of a second doping type. Furthermore, the first semiconductor region 240a and the third semiconductor region 240b are of the second doping type and embedded in the first semiconductor structure 210. Furthermore, the second semiconductor region 250b and the fourth semiconductor region 250a are of the first doping type and embedded in the second semiconductor structure 220. An interface 230 between the first semiconductor structure 210 and the second semiconductor structure 220, as shown in FIG. 3, is meander-shaped in a lateral direction of expansion. A polysilicon feedback strip 440, as has already been shown in FIG. 4, passes along the interface 230 in a lateral direction of expansion.

The first semiconductor region 240a and the fourth semiconductor region 250b are arranged adjacent to each other, on a first side (e.g., a first edge) of the thyristor structure 120. The third semiconductor region 240b and the second semiconductor region 250a are arranged adjacent to each other, on a second side (e.g., a second edge) of the thyristor structure 120. The first side of the thyristor structure 120 is, in the top view, opposite to the second side of the thyristor structure 120. The four semiconductor regions 240a, 240b, 250a, 250b are L-shaped, in the top view. The poly silicon feedback strip 440 extends from the first side of the thyristor structure 120 between the first semiconductor region 240a and the adjacent fourth semiconductor region 250b. The poly silicon feedback strip 440 extends to the second side of the thyristor structure 120 between the third semiconductor region 240b and the adjacent second semiconductor region 250a. The poly silicon feedback strip 440 extends therefore along the meander shaped interface 230.

The supply voltage terminal 130 is a supply voltage rail, which is hard wired to the third semiconductor region 240b via contacts 501 of the supply voltage rail 130. The ground terminal 140 is a ground rail 140, which is hard wired to the second semiconductor region 250b via contacts 503 of the ground rail 140. The supply voltage rail 130 and the ground rail 140 extend parallel to each other from the first side of the thyristor structure 120 to the second side of the thyristor structure 120.

A first metal strip 510 (in FIG. 5 also "N") extends parallel to the supply voltage rail 130 and the ground rail 140 from the first side of the thyristor structure 120 to the second side of the thyristor structure 120.

The first metal strip 510 is hard wired to the second semiconductor region 250a.

A second metal strip 520 (in FIG. 5 also "P") extends parallel to the supply voltage rail 130 and the ground rail 140 from the first side of the thyristor structure 120 to the second side of the thyristor structure 120.

The second metal strip 520 is hard wired to the first semiconductor region 240a.

In the top view the metal strips 510, 520 are above the 4 semiconductor regions 240a, 240b, 250a, 250b and above the polysilicon feedback strip 440.

According to some embodiments, the thyristor structure 120 may be attached to a control circuit 410 in an electrically conductive manner, for example, via the first metal strip 510 and the second metal strip 520 as well as via the polysilicon feedback strip 440.

In other words, FIG. 5 shows an implementation of the arrangement and the contacting of the $p^+$ and $n^+$ regions between the inverters (and/or the nodes N and P) of FIG. 4.

The thyristor structure 120, according to FIG. 5, comprises a meander-shaped nWell-pWell/Sub boundary 230, and a combination of p+ and n+ regions (240b, 250b), that are hardwired to VDD and/or VSS and of p+ and n+ regions (240a, 250a) that can be connected to VDD and VSS or alternatively to VSS and VDD in a switchable manner, as it is shown in FIG. 4.

Figure 6:
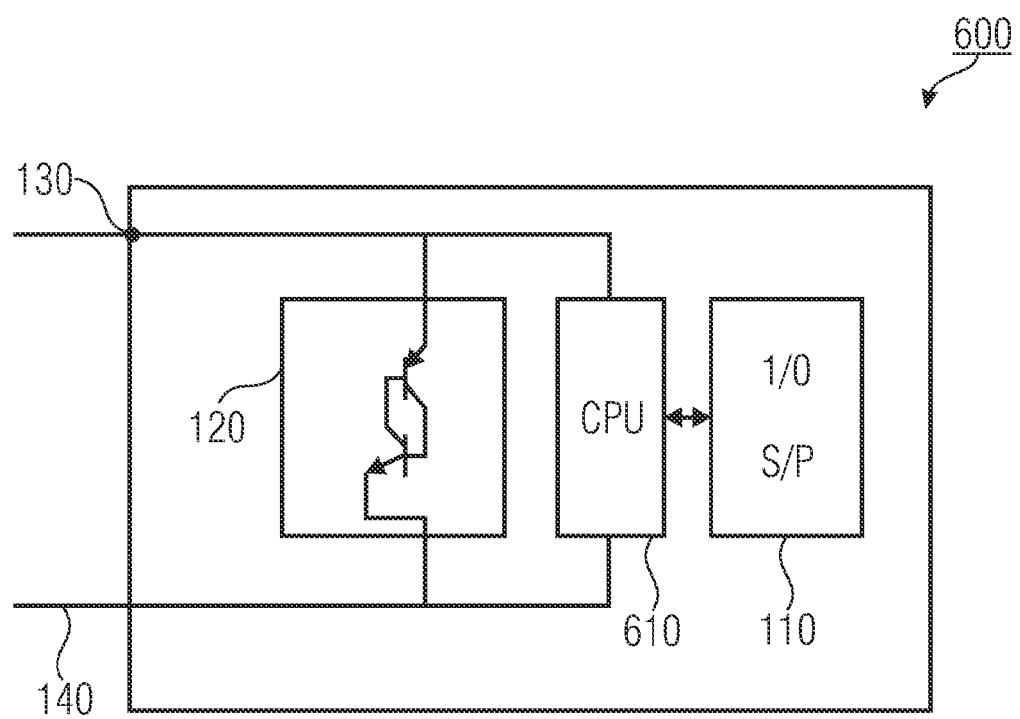
FIG. 6 is a schematic illustration of an integrated circuit according to an embodiment.

FIG. 6 shows a schematic illustration of an integrated circuit 600 according to an embodiment. The integrated circuit 600 shown in FIG. 6 comprises, in addition to the integrated circuit 100 shown in FIG. 1, a processor, for example, a cryptographic processor 610. The circuit 110 may here, for example, be configured to store information of the cryptographic processor 610 or information for use by the cryptographic processor 610. In other words the circuit 110 may be a memory unit 110 coupled to the cryptographic processor 610. The integrated circuit 600 shown in FIG. 6 is configured to affect (e.g., to disturb or interrupt) a function of the cryptographic processor 610 in response to a turning on of the thyristor structure 120. In other words, if an attacker tries to alter a behavior (e.g., change the logic state or change the data) of the circuit 110 by way of ionizing radiation, for example, to perform a fault attack, the thyristor structure 120 turns on before the behavior of the circuit 110 is altered (e.g., before the circuit 110 changes its state or before a data of the circuit 110 is changed). This leads to a short of the two power supply terminals 130, 140, i.e., a low-ohmic connection between a supply voltage terminal 130 and a ground terminal 140 of the integrated circuit 600, for example, and hence to a disturbance of the function of the cryptographic processor 610. The turning on of the thyristor structure 120 may thus lead to a change of behavior of the integrated circuit 600, e.g., a partial or total deactivation of the integrated circuit 600, or even to a complete destruction of the integrated circuit 600, whereby it is no longer possible for an attacker to carry out an attack on the integrated circuit 600.

Figure 7:
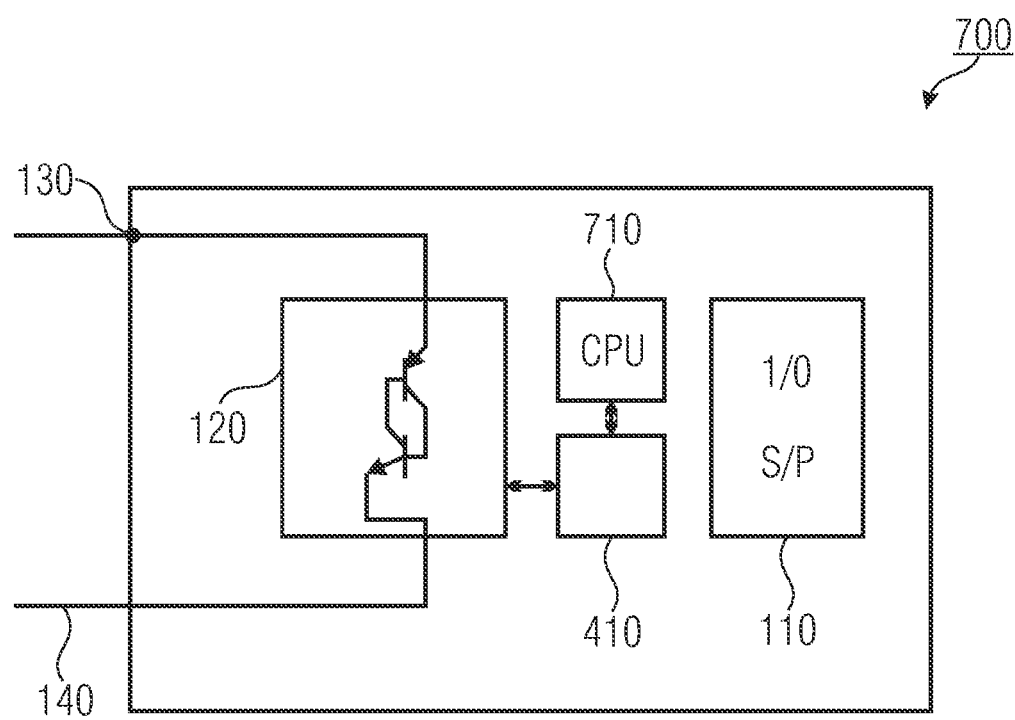
FIG. 7 is a schematic illustration of an integrated circuit according to an embodiment.

FIG. 7 shows a schematic illustration of an integrated circuit 700 according to an embodiment. With respect to the integrated circuit 100 shown in FIG. 1, the integrated circuit 700 shown in FIG. 7 additionally comprises a processor, for example, a cryptographic processor 710 and a control circuit 410. As already explained with reference to FIG. 4, the control circuit 410 is configured to enable or disable an action of the thyristor structure 120 and to form an output signal, starting from an input signal, using structural components of the thyristor structure (e.g., the p+-doped first semiconductor region 240 and the n+-doped second semiconductor region 250). The cryptographic processor 710 is configured to provide the input signal to the control circuit 410 and to detect the output signal, and to make a decision, based on a comparison of the input signal with the output signal, as to whether a function of the cryptographic processor 710 is to be altered or deactivated. In other words, the cryptographic processor 710 is configured to perform a check as to whether the thyristor structure 120 has been manipulated by an attacker and, responsive thereto, make a decision as to whether a function is to be performed or not. In an application, this check may be performed before each security-critical computation of the cryptographic processor 710. According to some embodiments, the cryptographic processor 710 may be configured to perform a self-destruction of the integrated circuit 700, for example, by shorting the two power supply terminals 130, 140, upon detection of a manipulation of the thyristor structure 120.

The integrated circuits 100, 600, 700 shown in FIGS. 1, 6 and 7 may, for example, be part of a chip card or any ICs for security applications.

The thyristor structures 120 shown in the above-described embodiments can be realized as hand crafted, so called full-custom circuitry as well as employing the so called standard cell design. Standard cell type ICs comprise a plurality of standard gates (e.g., NAND, NOR, Flip-Flops), i.e., the design of this standard cell type ICs may be mainly done on logical (gate) level, in contrast to transistor level full-custom designs. In the standard cell design, voids (filler cells), often serving for wiring or as a capacitance in form of pn diodes, are created by way of layout optimization. If a pn junction is reverse biased in such a filler cell, the filler cell forms a capacitance, but if the pn junction is not reverse biased, the filler cell may form a thyristor structure. A "desired" thyristor structure, which is implemented in embodiments of the present invention to replace a conventional "parasitic" structure, differs by a parasitic thyristor structure, since it needs less power density of ionizing radiation to turn on, for example, only about half of the energy of a conventional parasitic structure. While the distance between an n well (the first semiconductor structure 210 according to FIG. 2, for example) and a p well and/or p substrate (the second semiconductor structure 220 according to FIG. 2, for example) may be chosen to be as great as possible, for reducing current gains of parasitic thyristors in the conventional standard cell design, this distance is chosen to be as small as possible in a desired thyristor, which is part of a chip according to an embodiment of the present invention. The interface (the interface 230 according to FIG. 2, for example) between these two areas, namely the n well (the first semiconductor structure 210 according to FIG. 2, for example) and the p well and/or p substrate (the second semiconductor structure 220 according to FIG. 2, for example) may be as small as possible in the conventional standard cell design, but in a desired thyristor, which is part of a chip according to an embodiment of the present invention, this interface is chosen to be meander-shaped, in order to increase the sensitive region and to enhance the bipolar current gains of the desired thyristor.

Embodiments thus are optimized so that a required optical power density for turning on the thyristor structure 120 is lower than a power density of the radiation needed for a change of data of a circuit 110, e.g., a change of a behavior of a CMOS integrated circuit 110 or change of a logic state of a memory unit 110 or memory cell 110, such as a latch or a flip-flop.

Furthermore, embodiments allow for determining the response threshold of the thyristor structure 120 and/or a memory unit 110 by using a control circuit, for example, a control circuit 410 according to FIG. 4.

According to some embodiments, a thyristor structure 120 can be optimized by being placed at a great distance from the well and/or substrate contact, while critical circuits, i.e., memory units, for example, are arranged close to well and/or substrate contacts.

Thus, embodiments can be optimized with respect to low power density of radiation needed for turning on the thyristor structure 120 by arranging the integrated circuits comprising the thyristor structures 120 at distances as large as possible from substrate contacts and/or well contacts. Ionizing radiation produces charge separation at the pn junctions of the thyristor structures 120, thereby giving rise to potential differences that cannot drop quickly enough due to the great distances of the pn junctions of the thyristor structures 120 to the substrate/well contacts before the thyristor structure 120 turns on. In critical circuits, which are arranged close to substrate/well contacts, ionizing radiation also produces charge separation at pn junctions, wherein the potential differences can drop quickly due to the proximity to the substrate/well contact before their parasitic thyristor structures turn on.

In particular, embodiments may be optimized so as to respond even when they are not irradiated directly with radiation, but when the radiation impinges in a neighboring region. In other words, if an attacker irradiates, e.g., a memory unit arranged adjacently with respect to an integrated circuit according to an embodiment, the thyristor structure of the integrated circuit may turn on before the memory unit changes its logic state.

Above all, embodiments may find application in security-critical circuits, for example, in chip cards, where they may be arranged at arbitrary distances (e.g., at irregular distances). In the standard cell, design embodiments may be arranged in above-described filler cells, which are created by way of layout optimization. Hence, embodiments do not need any additional area and only little additional effort for layout.

Furthermore, embodiments may be used in the prevention of systematic fault attacks by means of ionizing radiation on digital circuits in ICs for security applications.

A basic idea of embodiments is to achieve the above-mentioned goal of "prevention of systematic fault attacks by means of ionizing radiation" by taking advantage of an effect that plays an important role in ICs in CMOS (Complementary Metal-Oxide-Semiconductor) technologies even in the case of increasing structural shrinkage. It has been found that fault attacks by means of ionizing radiation (e.g., LASER)—given sufficiently high energy transfers of the radiation—lead to action (the so-called latch-up or silicon controlled rectifying (SCR)) (which is undesired by the attacker) of parasitic p-n-p-n thyristors, which inevitably are to be found in any CMOS technology and practically any CMOS gate. It has been found that the response threshold of these thyristors (in units of LASER-Pulse intensity) can be adjusted by an appropriate design to be on the same order of magnitude as the corresponding threshold for a change of data or a malfunction of a circuit used for storing and/or processing data, e.g., for the flipping (intended by the attacker) of a bit stored in a memory circuit (e.g., a latch, a flip-flop or an SRAM cell). In both cases (thyristor action and changing of the data of the circuit used for storing and/or processing data or a malfunction of the circuit used for storing and/or processing data), photocurrent pulses are the cause, which develop by way of photo-ionization (electron-hole-pair generation) within reverse-biased pn junctions. Also it has been found that the security can be increased even more if the thyristor structures are designed such that a power density of the radiation needed for the turning on of the thyristor structures (for the thyristor action) is lower than a power density of the radiation needed for a for a change of data or a malfunction of a circuit used for storing and/or processing data, e.g., for change of state of a memory unit of the corresponding integrated circuit. Accordingly, it has been found that an improved security level can be obtained by replacing the conventional doctrine of avoiding SCR-activation in CMOS circuits by the teaching to implement SCR-structures having a comparatively high sensitivity to ionizing radiation on such CMOS circuits.

Conventionally CMOS gates are designed in a way resulting in maximum efficiency, small area, little energy consumption and high speed. Moreover, the design rules that the layout of CMOS circuits satisfy also include special (distance) rules that preclude the occurrence of latch-up under all possible normal operating conditions.

Conventionally, in any case, no importance at all is attached to making CMOS gates as sensitive as possible to radiation-induced SCR within the framework of the design rules. In contrast embodiments are optimized, such that a thyristor structure is as sensitive as possible to radiation-induced SCR, at least more sensitive than all corresponding "regular" CMOS circuits or circuits used for storing and/or processing data, e.g., memory units, which could be aim of an attack, such that the thyristor structure turns on before a change of data or a malfunction of the "regular" CMOS circuits or the circuits used for storing and/or processing data occur, e.g., before a bit flip in a memory unit occurs, i.e., before a change of state of the memory unit occurs.

Figure 8:
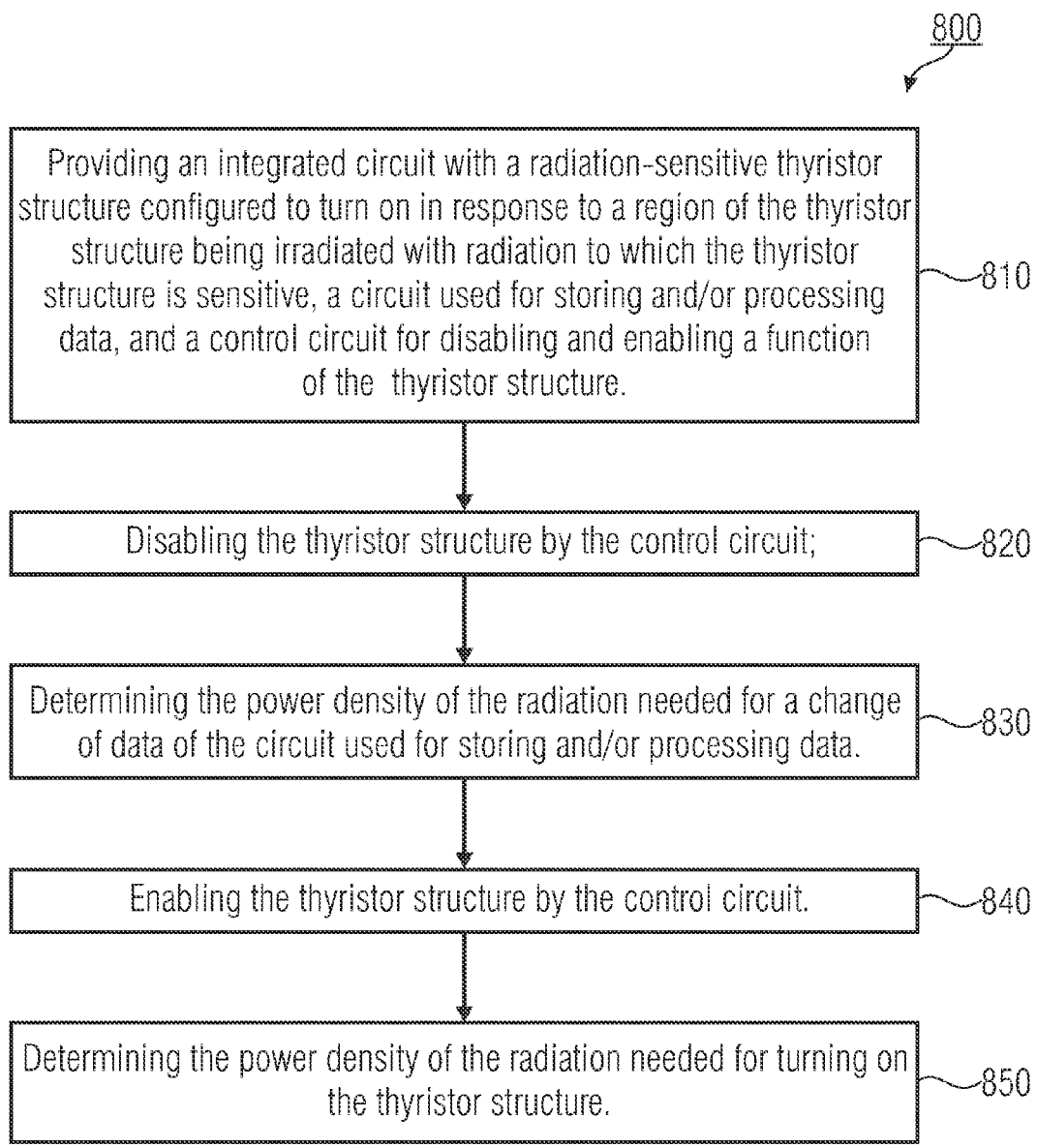
FIG. 8 is a flow chart of a test method for determining the radiation sensitivity of an integrated circuit, according to an embodiment.

FIG. 8 shows a flow chart of a test method 800 for determining the radiation sensitivity of an integrated circuit, according to an embodiment. The test method 800 comprises a step 810 of providing the integrated circuit with a radiation-sensitive thyristor structure configured to turn on responsive to a region of the thyristor structure being irradiated with radiation to which the thyristor structure is sensitive, a circuit used for storing and/or processing data, and a control circuit for disabling and enabling an action of the thyristor structure. The integrated circuit may, for example, be an integrated circuit 100 (with a thyristor structure 120 and a circuit 110) according to FIG. 1 and a control unit 410 according to FIG. 4.

Furthermore, the test method 800 comprises a step 820 of disabling the thyristor structure by the control circuit. This may, for example, be done by resetting the input signal EN of the control circuit 410 shown in FIG. 4. Here, a supply potential is applied to the second semiconductor region 250 of the thyristor structure 120 shown in FIG. 4, and the pn$^+$ junction between the second semiconductor structure 220 and the second semiconductor region 250 is reverse-biased, and a ground potential is applied to the first semiconductor region 240, thereby also reverse-biasing the p$^+$n junction between the first semiconductor structure 210 and the first semiconductor region 240 and disabling an action of the thyristor structure 120.

Furthermore, the test method 800 comprises a step 830 of determining the power density of the radiation needed for a change of data of the circuit used for storing and/or processing data. The memory unit may, for example, be the circuit 110 according to FIG. 1. The determination of the required power density for the change of data of the circuit 110 may, for example, be made by way of a continuous or stepwise increase of the power density of the radiation while monitoring the data of the circuit 110. If the data of the circuit 110 changes, the required power density of the radiation can be determined. A turning on of the thyristor structure 120 is excluded due to the disabling by the control circuit.

Moreover, the test method 800 comprises a step 840 of enabling the thyristor action by the control circuit. This may, for example, be done by setting the input signal EN shown in FIG. 4. Here, a ground potential is applied to the second semiconductor region 250 shown in FIG. 4, wherein the pn$^+$ junction between the second semiconductor structure 220 and the second semiconductor region 250 is no longer reverse biased. Furthermore, a supply voltage potential is applied to the first semiconductor region 240, wherein the p$^+$n junction between the first semiconductor structure 210 and the first semiconductor region 240 is no longer reverse biased. Zero-biasing these two junctions leads to enabling of the thyristor structure 120 shown in FIG. 4.

Furthermore, the test method 800 comprises a step 850 of determining the power density of the radiation needed for turning on the thyristor structure. According to embodiments, for example, this may be done in a way corresponding to the step 830 of determining the power density of the radiation needed for a change of data of the circuit 110. For example, the thyristor structure 120 may be irradiated with radiation increasing in power density over time, and the power density needed can be determined upon a turning on of the thyristor structure 120. According to embodiments, the thyristor structure 120 can be optimized so that a power density of the radiation needed for turning on the thyristor structure 120 is lower than a power density of the radiation needed for a change of data of the circuit 110. According to embodiments, hence, a control circuit 410 shown in FIG. 4 allows for testing the integrated circuit for radiation sensitivity.

Figure 9:
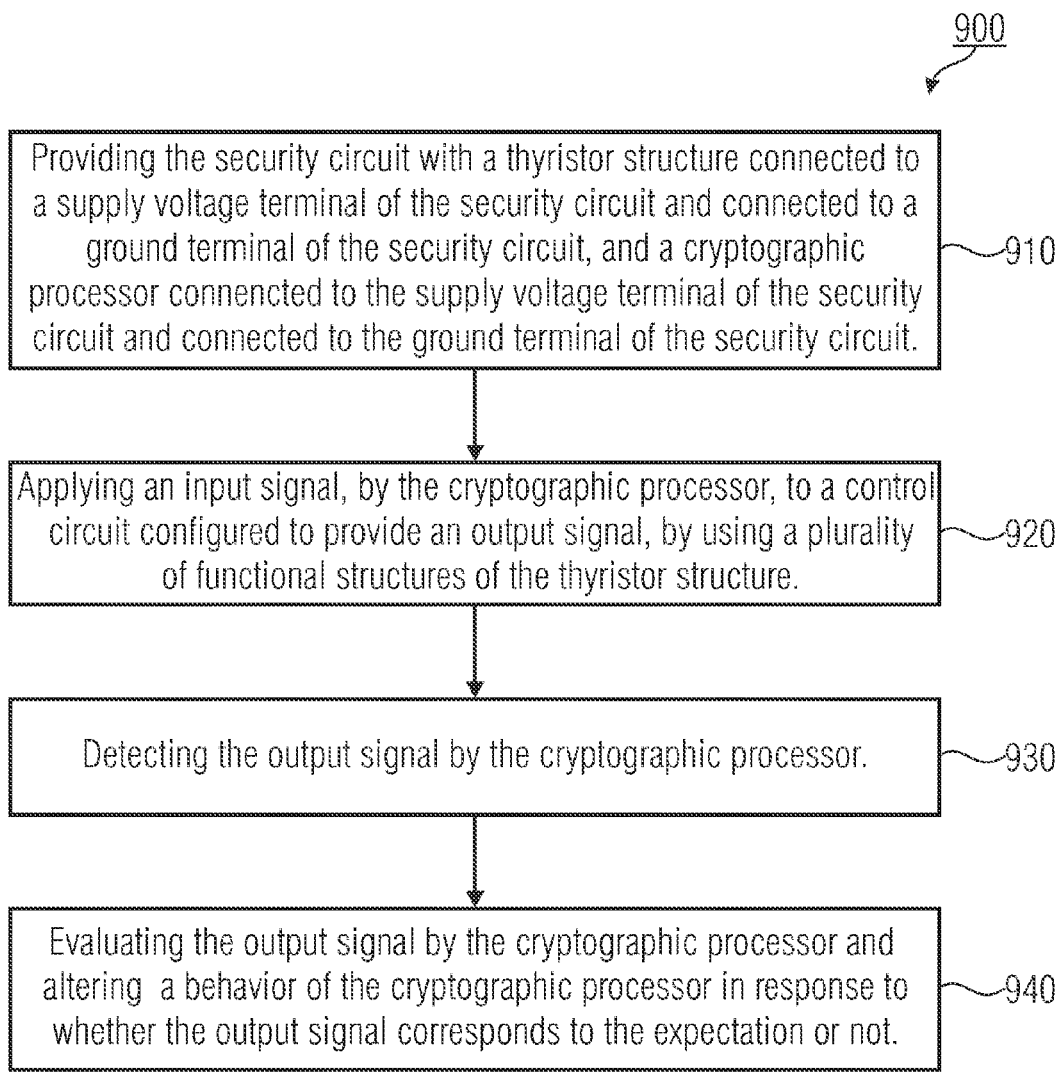
FIG. 9 is a flow chart of a method of protecting from an attack on a security circuit, according to an embodiment.

FIG. 9 shows a flow chart of a method 900 of protecting from an attack on a security circuit, according to an embodiment. The security circuit may, for example, be integrated in a chip card or a security chip.

The method 900 comprises a step 910 of providing the security circuit with a thyristor structure connected between a supply voltage terminal and a ground terminal of the security circuit and a cryptographic processor connected between the supply voltage terminal and the ground terminal. The security circuit may, for example, be the integrated circuit 600 according to FIG. 6.

Furthermore, the method 900 comprises a step 920 of applying an input signal to a control circuit, which is configured to provide an output signal using structural components or functional structures of the thyristor structure (for example, the first semiconductor region 240 and/or the second semiconductor region 250, as shown in FIG. 4), by the cryptographic processor. According to embodiments, the control circuit may, for example, be a control circuit 410 shown in FIG. 4, which may form and provide an output signal using structural components of the thyristor structure. The input signal may, for example, be any combination of various logic states. An input signal could be a logic 0-1 edge, for example, which may again provide a 0-1 edge as an output signal.

Furthermore, the method 900 comprises a step 930 of detecting the output signal of the control circuit by the cryptographic processor. According to embodiments, the cryptographic processor may comprise a logic input, for example, a digital input, to detect and store the output signal of the control circuit.

Furthermore, the method 900 comprises a step 940 of evaluating the output signal of the control circuit by the cryptographic processor and altering a behavior of the cryptographic processor in dependence on whether the output signal of the control circuit corresponds to the expectation or doesn't correspond to the expectation. According to embodiments, the method 900 can be performed before every security-critical computation by the cryptographic processor, for example, so as to check whether there has been any manipulation of the security circuit. If the output signal does not correspond to the expectations, the cryptographic processor may be configured to behave differently, e.g., not to perform a computation or even to destroy the security circuit, for example, by shorting the supply voltage terminal and the ground terminal.

The methods 800 and 900 can be supplemented by any of the features or functionalities and aspects of the devices and apparatuses, described herein.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An integrated circuit, comprising:
   a circuit used for storing or processing data; and
   a radiation-sensitive thyristor structure configured to conditionally short two power supply terminals of the integrated circuit,
   wherein the thyristor structure is configured to turn on in response to a region of the thyristor structure being irradiated with radiation to which the thyristor structure is sensitive, in order to establish an electrically conductive connection between a first power supply terminal of the power supply terminals of the integrated circuit and a second power supply terminal of the power supply terminals of the integrated circuit; and
   wherein the thyristor structure is configured so that a power density of the radiation needed for turning on the thyristor structure is lower than a power density of the radiation needed for a change of data of the circuit used for storing or processing data.

2. The integrated circuit according to claim 1, wherein the circuit used for storing or processing data is a memory unit for storing a logic state, and wherein the thyristor structure is configured so that a power density of the radiation needed for turning on the thyristor structure is smaller than a power density of the radiation needed for a change of state of the memory unit of the integrated circuit.

3. The integrated circuit according to claim 1, wherein the thyristor structure further comprises:
   a first semiconductor structure of a first doping type, a second semiconductor structure of a second doping type, a first semiconductor region of the second doping type and a second semiconductor region of the first doping type;
   wherein a first junction between the first doping type and the second doping type is formed between the first semiconductor structure and the second semiconductor structure;
   wherein the first semiconductor region is arranged within the first semiconductor structure such that a second junction between the first doping type and the second doping type is formed between the first semiconductor region and the first semiconductor structure; and
   wherein the second semiconductor region is arranged within the second semiconductor structure such that a third junction between the first doping type and the second doping type is formed between the second semiconductor region and the second semiconductor structure.

4. The integrated circuit according to claim 3, wherein the first doping type is an n-doping type and the second doping type is a p-doping type.

5. The integrated circuit according to claim 3, wherein the first semiconductor region is doped more heavily than the second semiconductor structure, and wherein the second semiconductor region is doped more heavily than the first semiconductor structure.

6. The integrated circuit according to claim 3,
   wherein the first power supply terminal is formed as a supply voltage terminal, and the second power supply terminal is formed as a ground terminal;
   wherein the first semiconductor structure is connected to the supply voltage terminal in an electrically conductive manner; and
   wherein the second semiconductor structure is connected to the ground terminal in an electrically conductive manner.

7. The integrated circuit according to claim 6, wherein the first semiconductor region is connected to the supply voltage terminal; and wherein the second semiconductor region is connected to the ground terminal.

8. The integrated circuit according to claim 6, further comprising a control circuit, wherein the control circuit is configured to switchably connect the first semiconductor region to the supply voltage terminal in an electrically conductive manner in a first state and to connect the second semiconductor region to the ground terminal in an electrically conductive manner in the first state, and to connect the first semiconductor region to the ground terminal in an electrically conductive manner in a second state and to connect the second semiconductor region to the supply voltage terminal in an electrically conductive manner in the second state, on the basis of an input signal of the control circuit.

9. The integrated circuit according to claim 8, wherein the control circuit comprises two inverters connected in series;

wherein an input of a first inverter of the two inverters configured to receive the input signal of the control circuit, and an output of the first inverter is connected to the second semiconductor region in an electrically conductive manner; and wherein the second semiconductor region is connected to an input of a second inverter of the two inverters in an electrically conductive manner, and an output of the second inverter is connected to the first semiconductor region in an electrically conductive manner.

10. The integrated circuit according to claim 9, wherein the second semiconductor region is connected to an input of the second inverter via an electrically conductive structure passing along a direction of expansion of the first junction formed between the first semiconductor structure and the second semiconductor structure; and wherein the electrically conductive structure comprises polysilicon.

11. The integrated circuit according to claim 8, wherein the first semiconductor region and the second semiconductor region are coupled; and wherein the control circuit is configured to provide a potential to the second semiconductor region, in dependence on the input signal of the control circuit, and to provide an output signal of the control circuit in dependence on a potential of the first semiconductor region.

12. The integrated circuit according to claim 11, wherein the control circuit comprises a third inverter and a fourth inverter;

wherein an input of the third inverter is connected to the first semiconductor region in an electrically conductive manner;

wherein an input of the fourth inverter is connected to an output of the third inverter in an electrically conductive manner; and wherein the output signal of the control circuit is based on an output of the fourth inverter.

13. The integrated circuit according to claim 11, further comprising a cryptographic processor, wherein the cryptographic processor is configured to provide the input signal of the control circuit and to detect the output signal of the control circuit, and to make a decision as to whether a function of the cryptographic processor is to be altered on the basis of a comparison of the input signal of the control circuit with the output signal of the control circuit.

14. The integrated circuit according to claim 3, wherein the first junction, formed between the first semiconductor structure and the second semiconductor structure is meander-shaped in a lateral direction of expansion.

15. The integrated circuit according to claim 3, wherein the first semiconductor structure is a first semiconductor well;

wherein the second semiconductor structure is at least a part of a second semiconductor well or of a semiconductor substrate of the integrated circuit; and wherein the first semiconductor well is arranged adjacent to the second semiconductor well or within the semiconductor substrate such that the first junction is an interface between the first semiconductor well and the second semiconductor well or the semiconductor substrate of the integrated circuit.

16. The integrated circuit according to claim 3, wherein the thyristor structure is configured to turn on if a potential of the first semiconductor structure is lowered, due to the radiation, by at least a barrier voltage of the second junction between the first semiconductor region and the first semiconductor structure with respect to a potential of the first semiconductor region, or if a potential of the second semiconductor structure is increased, due to the radiation, by at least a barrier voltage of the third junction between the second semiconductor region and the second semiconductor structure with respect to a potential of the second semiconductor region.

17. The integrated circuit according to claim 1, wherein the integrated circuit further comprises a cryptographic processor;

wherein the memory unit is configured to store information of the cryptographic processor; and wherein the integrated circuit is configured to affect a function of the cryptographic processor responsive to a turning on of the thyristor structure.

18. A chip card, comprising:

an integrated circuit, comprising:

a circuit used for storing or processing data;

a radiation-sensitive thyristor structure configured to conditionally short two power supply terminals of the integrated circuit, wherein the thyristor structure is configured to turn on in response to a region of the thyristor structure being irradiated with radiation to which the thyristor structure is sensitive, in order to establish an electrically conductive connection between a first power supply terminal of the power supply terminals of the integrated circuit and a second power supply terminal of the power supply terminals of the integrated circuit; and wherein the thyristor structure is configured so that a power density of the radiation needed for the turning on of the thyristor structure is lower than a power density of the radiation needed for a change of data of the circuit used for storing or processing data; and a cryptographic processor with two supply potential terminals, wherein a first one of the supply potential terminals of the cryptographic processor is connected to the first power supply terminal in an electrically conductive manner, and a second one of the supply potential terminals of the cryptographic processor is connected to the second power supply terminal in an electrically conductive manner; and wherein the chip card is configured to affect a function of the cryptographic processor in response to a turning on of the thyristor structure.

19. An integrated circuit, comprising:

a circuit used for storing or processing data;

a radiation-sensitive thyristor structure configured to conditionally short a supply voltage terminal and a ground terminal of the integrated circuit;

a control circuit configured to disable or enable a function of the thyristor structure on the basis of an input signal;

wherein a first junction between an n-doped first semiconductor structure of the thyristor structure and a p-doped second semiconductor structure of the thyristor structure is meander-shaped in a lateral direction of expansion;

wherein a p-doped first semiconductor region is arranged in the n-doped first semiconductor structure;

wherein an n-doped second semiconductor region is arranged in the p-doped second semiconductor structure;

wherein the n-doped second semiconductor region is doped more heavily than the n-doped first semiconductor structure, and the p-doped first semiconductor region is doped more heavily than the p-doped second semiconductor structure;

wherein the n-doped first semiconductor structure is connected to the supply voltage terminal of the integrated circuit, and the p-doped second semiconductor structure is connected to the ground terminal of the integrated circuit;

wherein the thyristor structure is configured to turn on if a potential of the n-doped first semiconductor structure is lowered by at barrier voltage of a second junction between the n-doped first semiconductor structure and the p-doped first semiconductor region with respect to a potential of the p-doped first semiconductor region due to radiation to which the thyristor structure is sensitive, or if a potential of the p-doped second semiconductor structure is increased, due to the radiation, by at least a barrier voltage of a third junction between the p-doped second semiconductor structure and the n-doped second semiconductor region with respect to a potential of the n-doped second semiconductor region;

wherein a power density of the radiation needed for turning on the thyristor is lower than a power density of the radiation needed for a change of data of the circuit used for storing or processing data;

wherein the control circuit comprises four inverters connected between the supply voltage terminal and the ground terminal;

wherein an input of a first one of the four inverters is configured to receive the input signal;

wherein an output of the first inverter is connected to the n-doped second semiconductor region in an electrically conductive manner;

wherein the n-doped second semiconductor region is connected to an input of a second one of the four inverters via an electrically conductive structure;

wherein the electrically conductive structure comprises polysilicon strip and passes along a direction of expansion of the first junction between the n-doped first semiconductor structure and the p-doped second semiconductor structure of the thyristor structure;

wherein an output of the second inverter is connected to the p-doped first semiconductor region in an electrically conductive manner;

wherein the p-doped first semiconductor region is connected to an input of a third one of the four inverters in an electrically conductive manner;

wherein an output of the third inverter is connected to an input of a fourth one of the four inverters; and wherein an output signal of the control circuit is based on an output of the fourth inverter.

20. A test method for determining the radiation sensitivity of an integrated circuit, the test method comprising:
providing an integrated circuit with a radiation-sensitive thyristor structure configured to turn on in response to a region of the thyristor structure being irradiated with radiation to which the thyristor structure is sensitive, a circuit used for storing or processing data, and a control circuit for disabling and enabling a function of the thyristor structure;
disabling the thyristor structure by the control circuit;
determining a power density of the radiation needed for a change of data of the circuit used for storing or processing data;
enabling the thyristor structure by the control circuit; and
determining a power density of the radiation needed for turning on the thyristor structure.

21. A method for protecting from an attack on a security circuit, the method comprising:
providing a security circuit with a thyristor structure connected to a supply voltage terminal of the security circuit and connected to a ground terminal of the security circuit, and a cryptographic processor connected to the supply voltage terminal of the security circuit and connected to the ground terminal of the security circuit;
applying an input signal, by the cryptographic processor, to a control circuit configured to provide an output signal, by using a plurality of functional structures of the thyristor structure;
detecting the output signal by the cryptographic processor; and
evaluating the output signal by the cryptographic processor and altering a behavior of the cryptographic processor in response to whether the output signal corresponds to an expectation or not.

* * * * *